(12) United States Patent
Kato et al.

(10) Patent No.: US 6,501,612 B1
(45) Date of Patent: Dec. 31, 2002

(54) RECORDING MEDIUM AND TAPE DRIVE SUITABLE FOR THE SAME

(75) Inventors: Tatsuya Kato, Kanagawa (JP);
Katsumi Ikeda, Kanagawa (JP);
Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/407,197

(22) Filed: Sep. 28, 1999

(30) Foreign Application Priority Data

Sep. 30, 1998 (JP) .......................................... 10-278267

(51) Int. Cl.$^7$ .............................................. G11B 15/18
(52) U.S. Cl. ....................................................... 360/69
(58) Field of Search ........................... 360/69, 75, 132; 711/111, 154

(56) References Cited

U.S. PATENT DOCUMENTS

| | | | | |
|---|---|---|---|---|
| 5,852,534 A | * | 12/1998 | Ozue et al. .................... | 360/69 |
| 6,101,070 A | * | 8/2000 | Oguro ......................... | 360/132 |
| 6,182,191 B1 | * | 1/2001 | Fukuzono et al. .......... | 711/111 |

FOREIGN PATENT DOCUMENTS

| | | | |
|---|---|---|---|
| EP | 0646922 | 4/1995 | ........... G11B/27/11 |
| EP | 0851421 | 7/1998 | ........... G11B/27/11 |
| EP | 0862180 | 9/1998 | ........... G11B/27/11 |
| EP | 0978841 | 2/2000 | ........... G11B/27/11 |
| EP | 0981133 | 2/2000 | ........... G11B/27/32 |
| JP | 9171676 | 6/1997 | ........... G11B/27/00 |

* cited by examiner

Primary Examiner—David Hudspeth
Assistant Examiner—K. Wong
(74) Attorney, Agent, or Firm—Jay H. Maioli

(57) ABSTRACT

A tape drive device including a tape driver for information recording or reproduction is performed on a magnetic tape when a tape cassette having the magnetic tape accommodated therein is loaded, a memory driver through which when a memory for recording management information to manage the recording or reproduction to the magnetic tape is provided to the tape cassette, read-out or writing of the management information from/into the memory can be performed, a detector for detecting storage capacity information of the memory which is stored in the memory, and an identifier for identifying the storage capacity of the memory on the basis of the storage capacity information.

4 Claims, 16 Drawing Sheets

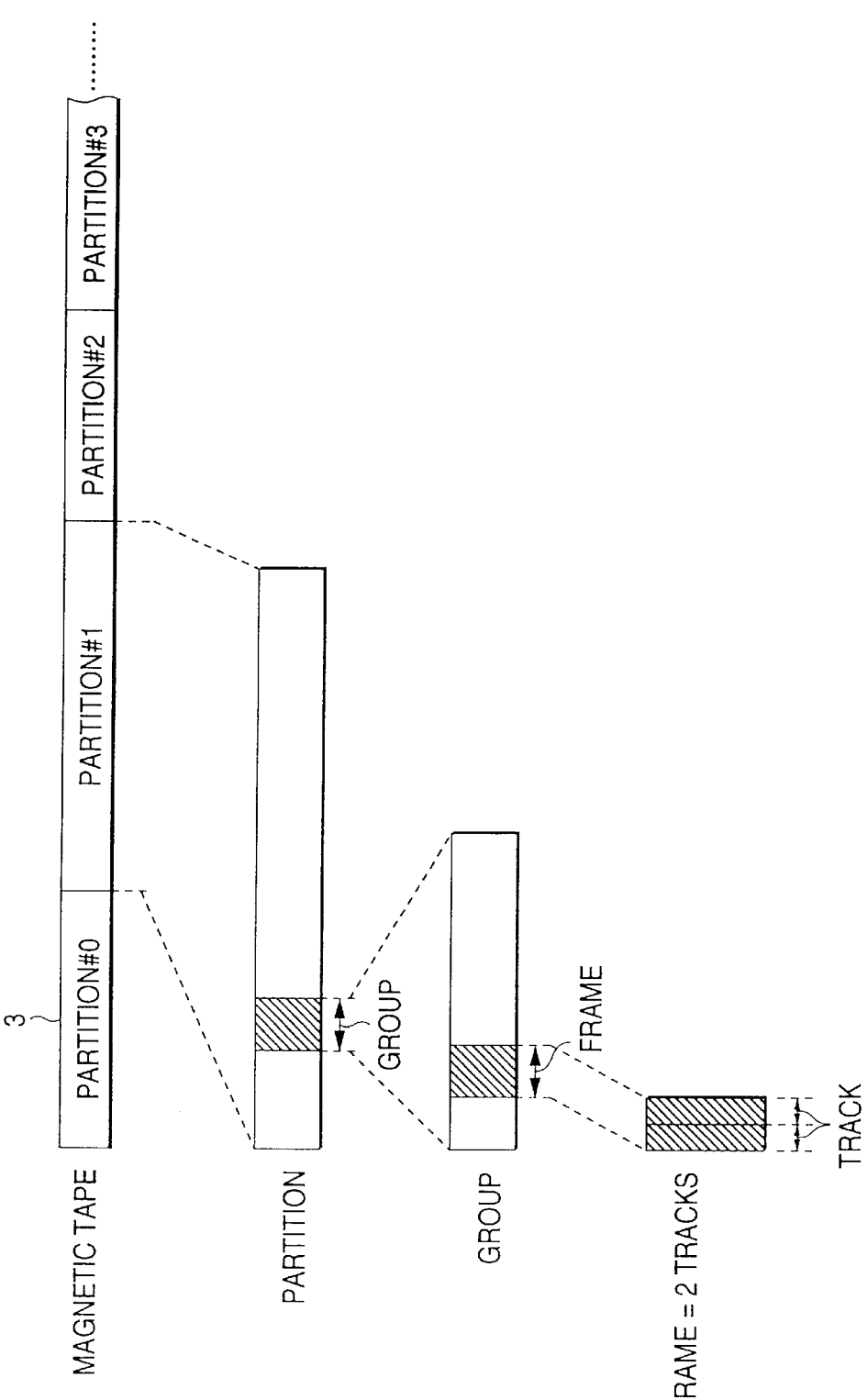

FIG. 8

| | | |
|---|---|---|
| MANUFACTURE PART (FL1) | MANUFACTURE PART CHECKSUM | 1 BYTE |
| | MIC TYPE | 1 BYTE |
| | MIC MANUFACTURE DATE | 4 BYTES |
| | MIC MANUFACTURE LINE NAME | 8 BYTES |
| | MIC MANUFACTURE PLANT NAME | 8 BYTES |
| | MIC MANUFACTURE NAME | 8 BYTES |
| | MIC NAME | 8 BYTES |
| | CASSETTE MANUFACTURE DATE | 4 BYTES |
| | CASSETTE MANUFACTURE LINE NAME | 8 BYTES |
| | CASSETTE MANUFACTURE PLANT NAME | 8 BYTES |
| | CASSETTE MANUFACTURER NAME | 8 BYTES |
| | CASSETTE NAME | 8 BYTES |
| | OEM CUSTOMER NAME | 8 BYTES |
| | RESERVED | 1 BYTE |
| | PHYSICAL TAPE CHARACTERISTIC ID | 1 BYTE |
| | MAXIMUM CLOCK FREQUENCY | 2 BYTES |
| | MAXIMUM WRITE BYTES COUNT/CYCLE | 1 BYTE |
| | MIC CAPACITY | 1 BYTE |
| | WRITE PROTECT TOP ADDRESS | 2 BYTES |
| | WRITE PROTECT BYTE COUNT | 2 BYTES |
| | RESERVED | 2 BYTES |

FIG. 10A

| VOLUME INFORMATION (FL3) | |
|---|---|
| VOLUME INFORMATION CHECKSUM | 1 BYTE |
| EJECT STATUS | 20 BYTES |
| REEL DIAMETER | 4 BYTES |
| RESERVED | 1 BYTE |
| INITIALIZE COUNT | 3 BYTES |
| VOLUME INFORMATION ON TAPE | 72 BYTES |

FIG. 10B

| VOLUME INFORMATION ON TAPE | | |
|---|---|---|
| RESERVED | 4 BYTES | |
| RESERVED | 2 BYTES | |
| RESERVED | 3 BITS | |
| SUPER HIGH SPEED SEARCH ENABLE FLAG | 1 BIT | |
| SYSTEM LOG ALLOCATION FLAGS | 2 BITS | 72 BYTES |
| ALWAYS UNLOAD PBOT FLAG | 1 BIT | |
| AIT/DDS FLAG | 1 BIT | |
| LAST VALID PARTITION NUMBER | 1 BYTE | |
| OPTIONAL DEVICE AREA ALLOCATION MAP (ARRAY [ 0 ··· 255 ] OF BIT) | 32 BYTES | |
| RESERVED | 32 BYTES | |

FIG. 11A

CELL STRUCTURE

| LINK INFORMATION | 8 BYTES |
|---|---|
| DATA | (n) BYTES |

FIG. 11B

LINK INFORMATION

| CELL CHECKSUM | 1 BYTE |
|---|---|
| RESERVED | 1 BYTE |
| CELL SIZE | 2 BYTES |
| PREVIOUS CELL POINTER | 2 BYTES |
| NEXT CELL POINTER | 2 BYTES |

8 BYTES

FIG. 12

PARTITION INFORMATION CELL

| LINK INFORMATION | | 8 BYTES |
|---|---|---|
| DATA | PARTITION MEMO | 8 BYTES |
| | PARTITION INFORMATION | 48 BYTES |

56 BYTES

FIG. 13

PARTITION INFORMATION

| | | | |
|---|---|---|---|
| PREVIOUS GROUPS WRITTEN | | 4 BYTES | |
| TOTAL GROUPS WRITTEN | | 4 BYTES | |
| RESERVED | | 1 BYTE | |
| PREVIOUS GROUPS READ | | 3 BYTES | |
| TOTAL GROUPS READ | | 4 BYTES | |
| RESERVED | | 1 BYTE | |
| TOTAL REWRITTEN FRAMES | | 3 BYTES | |
| RESERVED | | 1 BYTE | |
| TOTAL 3RD ECC COUNT | | 3 BYTES | |
| ACCESS COUNT | | 4 BYTES | |
| UPDATE REPLACE COUNT | | 4 BYTES | 48 BYTES |
| PREVIOUS REWRITTEN FRAMES | | 2 BYTES | |
| PREVIOUS 3RD ECC COUNT | | 2 BYTES | |
| RESERVED | | 1 BYTE | |
| LOAD COUNT | | 3 BYTES | |
| RESERVED | | 1 BYTE | |
| VALID MAXIMUM ABSOLUTE FRAME NUMBER | | 3 BYTES | |
| FLAG BYTE | BIT 1 | PREVENT WRITE | 1 BYTE |
| | BIT 2 | PREVENT READ | |
| | BIT 3 | PREVENT WRITE RETRY | |
| | BIT 4 | PREVENT READ RETRY | |
| | BIT 5 | RESERVED | |
| | BIT 6 | RESERVED | |
| | BIT 7 | RESERVED | |
| | BIT 8 | PARTITION IS OPENED | |
| MAXIMUM ABSOLUTE FRAME NUMBER | | 3 BYTES | |

RECORDING MEDIUM AND TAPE DRIVE SUITABLE FOR THE SAME

BACKGROUND OF THE INVENTION

1. Field of the Invention

The present invention relates to a recording medium used for data storage, and a tape drive device suitable for a tape cassette serving as a recording medium.

2. Description of the Related Art

A so-called tape streamer drive is known as a drive device which can record/reproduce digital data in a magnetic tape. Such a tape streamer drive can have a large recording capacity of about several tens to several hundreds giga-bytes although it is dependent on the tape length of the tape cassette serving as media, and thus it is widely used to such an application as to back up data recorded in media such as a hard disc of the computer body or the like. Further, it is suitably used to preserve image data or the like which has a large data size.

As such a tape streamer drive as described above has been proposed one which records/reproduces data by using a 8-mm VTR tape cassette as a recording medium and using a helical scan system based on a rotational head. The tape cassette described above contains a non-volatile memory comprising a memory IC.

For example, manufacturing information of a tape cassette, past use record information of the tape cassette, partition information of a magnetic tape, etc. are beforehand stored as management information in the non-volatile memory. By storing the management information in the non-volatile memory as described above, each of various operations can be more efficiently performed as compared with a case where management information is recorded in a specific area on a magnetic tape.

When the tape cassette is initialized (formatted) to form partitions on the magnetic tape, the non-volatile memory is also initialized to store partition information corresponding to the partitions. When the non-volatile memory is initialized, it is necessary to grasp the storage capacity of the non-volatile memory. Therefore, when the tape cassette is initialized, it is necessary to first perform specific read-in processing/writing processing on the non-volatile memory to thereby search the address corresponding to the storage capacity.

Further, when plural partitions are to be formed on the magnetic tape, partition information on each partition to be formed is required to be stored in the non-volatile memory. In this case, in order to identify whether desired partition information can be stored in the non-volatile memory, it is needed to search the address.

That is, when a tape cassette is formatted, there is a problem that much time is needed because the storage capacity is identified by searching the address of the non-volatile memory.

SUMMARY OF THE INVENTION

In order to solve the problem, there is provided a tape drive device comprising: tape drive means for recording or reproducing information into/from a magnetic tape when a tape cassette having the magnetic tape accommodated therein is loaded; memory drive means through which when a memory for recording management information to manage the recording or reproduction of information into/from the magnetic tape is provided to the tape cassette, the management information can be read out or written from/into the memory; means for detecting storage capacity information of the memory which is stored in the memory; and means for recognizing the storage capacity of the memory on the basis of the storage capacity information.

Further, in a recording medium which is provided to the tape cassette and has a memory for recording management information to manage recording or reproduction to the magnetic tape, the storage capacity information of the memory is stored in the memory.

According to the tape drive device of the present invention, the storage capacity information of a memory can be detected from the memory (MIC) which is provided to a tape cassette and records management information to manage recording or reproduction to a magnetic tape accommodated in the tape cassette.

Further, according to the recording medium, the storage capacity information of the memory is recorded as the management information in the memory (MIC) arranged together with the magnetic tape, so that the storage capacity of the memory can be grasped without searching the storage area of the memory at the drive device side.

BRIEF DESCRIPTION OF THE DRAWINGS

FIGS. 4A to 4D are diagrams showing the data structure recorded in the magnetic tape;

FIG. 8 is a diagram showing a manufacture part of MIC of the embodiment;

FIGS. 10A and 10B are diagrams showing volume information of MIC of the embodiment;

FIGS. 11A and 11B are diagrams showing the cell structure of MIC of the embodiment;

FIG. 12 is a diagram showing the partition information of MIC of the embodiment;

FIG. 13 is a diagram showing the partition information of the embodiment;

DETAILED DESCRIPTION OF THE PREFERRED EMBODIMENTS

Preferred embodiments according to the present invention are hereunder described.

Here, the assignee of this application previously proposed inventions on a tape cassette provided with a non-volatile memory and a tape drive device forming a data storage system which can record/reproduce digital data in connection with the tape cassette with the memory. The present invention is applied to a data storage system which corresponds to a tape cassette with a memory. The non-volatile memory provided to the tape cassette is assumed to be MIC (Memory In Cassette).

The description on the embodiments of the present invention will be made in the following order.

1. Construction of Tape Cassette
2. Construction of Tape Streamer Drive
3. Data structure on Magnetic Tape
4. Data structure of MIC
5. Format processing based on Storage Capacity of MIC

1. Construction of Tape Cassette

First, a tape cassette with MIC which corresponds to a tape streamer drive according to an embodiment of the present invention will be described with reference to FIGS. 1 and 2.

Figure 1:
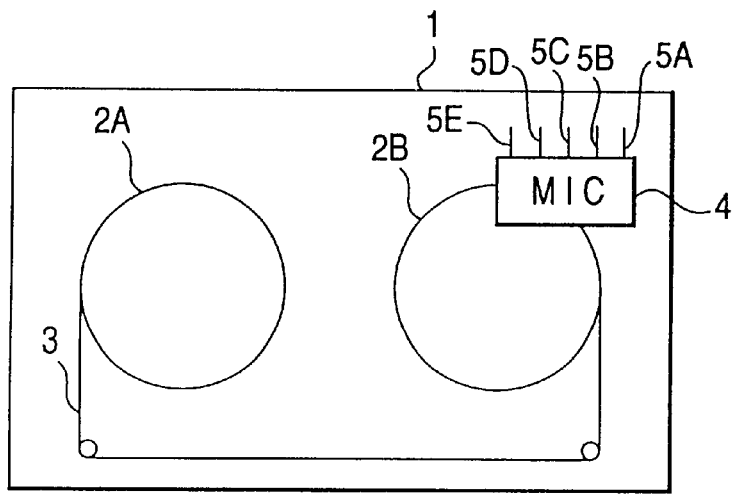
FIG. 1 is a schematic diagram showing the internal structure of a tape cassette according to the embodiment.

FIG. 1 conceptually shows the internal construction of a tape cassette. Reel hubs 2A, 2B are provided in the tape cassette 1 shown in FIG. 1, and a magnetic tape 3 having a tape width of 8mm is wound between the reel hubs 2A and 2B.

The tape cassette 1 is provided with MIC 4 which is a non-volatile memory, and five terminals 5A, 5B, 5C, 5D and 5E are extended from the module of MIC 4 and constructed as a data input terminal, a clock input terminal, an earth terminal, a preliminary terminal, respectively, which are described in more detail later. In MIC 4 are stored information on a manufacturing date (year, month, date) and a manufacturing place of each tape cassette, the thickness, length and material of a tape, past use records of recording data of each partition formed on the tape 3, etc., user information, etc. In this specification, these various information to be stored in the MIC 4 is referred to as "management information".

Figure 2:
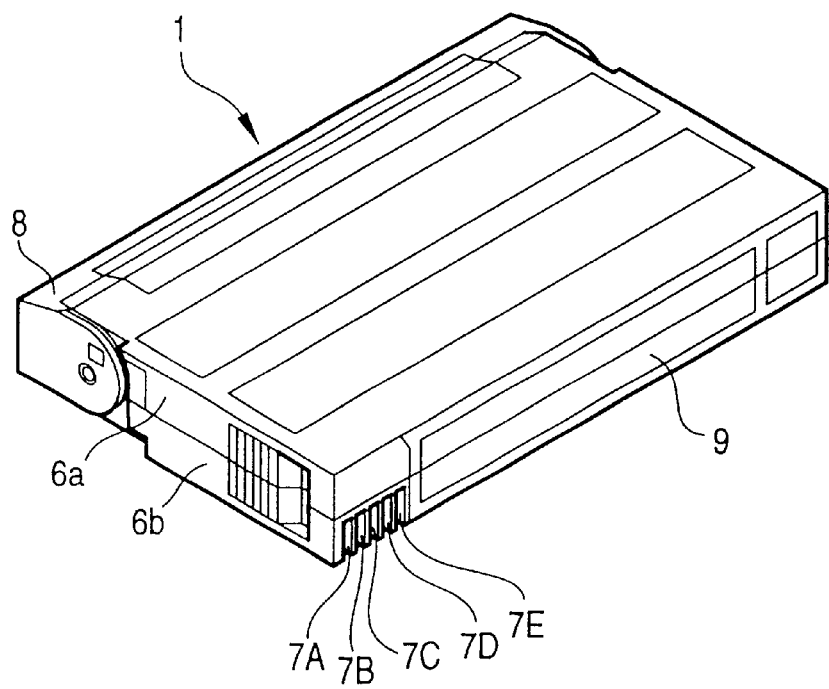
FIG. 2 is a perspective view showing the outlook of the tape cassette of the embodiment.

FIG. 2 shows the outlook of the tape cassette 1, and the overall housing thereof comprises an upper side case 6a, a lower side case 6b and a guard panel 8. The tape cassette 1 is basically designed in the same construction as a tape cassette used in a usual 8-mm VTR. Terminal pins 7A, 7B, 7C, 7D and 7E are provided on a label face at the side surface of the tape cassette 1, and these pins are connected to the terminals 5A, 5B, 5C, 5D, 5E respectively described with reference to FIG. 1. That is, in this embodiment, the tape cassette 1 is physically brought into contact with a tape streamer drive 10 described next through the terminal pins 7A, 7B, 7C, 7D, 7E to mutually transmit data signals, etc. therebetween.

2. Construction of Tape Streamer Drive

Next, the construction of a tape streamer drive 10 according to this embodiment will be described with reference to FIG. 3. The tape streamer drive 10 is designed to record/reproduce the magnetic tape 3 of the loaded tape cassette 1 on the basis of a helical scan system.

Two recording heads 12A and 12B having different azimuth angles and three reproducing heads 13A, 13B and 13C having desired azimuth angles are provided to a rotational drum 11 so as to be spaced -at predetermined angular-intervals.

The rotational drum 11 around which the magnetic tape 3 drawn out from the tape cassette 1 is rotated by a drum motor 14A. A capstan (not shown) for making the magnetic tape 3 run at a constant speed is rotationally driven by a capstan motor 14B.

The reel hubs 2A, 2B in the tape cassette 1 are independently rotated in a forward direction and in a reverse direction by reel motors 14C, 14D. A loading motor 14E rotates a loading mechanism (not shown) to execute a loading/unloading of the magnetic tape 3 into/from the rotational drum 11.

The drum motor 14A, the capstan motor 14B, the reel motors 14C, 14D, and the loading motor 14E are rotated by applying voltage from a mechanical driver 17 thereto. The mechanical driver 17 drives each motor under the control of a servo controller 16. The servo controller 16 controls the rotational speed of each motor to execute tape travelling in usual recording/reproducing operation, tape travelling in high-speed reproducing operation, a tape travelling in fast feeding, rewinding operation, a tape cassette loading operation, a loading/unloading operation, a tape tension control operation, etc.

As not shown, in order for the servo controller 16 to execute the servo control of each motor, each of the drum motor 14A, the capstan motor 14B and the reel motors 14C, 14D is provided with FG (frequency generator) to detect rotational information of each motor.

The servo controller 16 identifies the rotational speed of each motor on the basis of FG pulses of these FGs to detect an error from a target rotational speed for the rotational operation of each motor, and controls application of power corresponding to the error difference on the mechanical driver 17, thereby performing the rotational speed control based on close loop. Accordingly, in the normal travelling during the recording/reproducing operation or in various operations such as a high-speed search operation, a fast feeding operation, a rewinding operation, etc., the servo controller 16 can control each motor to rotate at a target rotational speed suitable for each of the operations.

In EEP-ROM 18 are stored constants, etc. which the servo controller 16 uses to perform servo control of each motor.

The servo controller 16 is interactively connected to the system controller 15 which executes the control processing of the overall system through interface controller/ECC formatter 22 (hereinafter referred to as IF/ECC controller).

In this table streamer drive 10, an SCSI interface 20 is used for input/output of data. For example, when data are recorded, sequential data are input from the host computer 40 through the SCSI interface 20 every fixed-length record serving as a transmission data unit, and supplied to a compression/expansion circuit 21. In such a table streamer drive system, there also exists a mode in which data are transmitted from the host computer 40 every assembly of data of variable length.

In the compression/expansion circuit 21, input data are subjected to compression processing by a specific system, if necessary. As an example of the compression system, for example if a compression system based on LZ code is used, in this system special-purpose codes are shared to a character sequence which was previously processed, and stored in a dictionary style. An input character sequence and the content of the dictionary are afterwards compared with each other, and if the character sequence of the input data is coincident with the code of the dictionary, the character sequence data are replaced by the code of the dictionary. The data of the input character sequence which is not coincident with the dictionary are sequentially supplied with a new code, and then registered in the dictionary. As described above, the data of the input character sequence are registered in the dictionary, and the character sequence data are replaced by the code of the dictionary, thereby performing the data compression.

The output of the compression/expansion circuit 21 is supplied to the IF/ECC controller 22, and in the IF/ECC controller 22, the output of the compression/expansion circuit 21 is temporarily accumulated in a buffer memory 23 by the control operation thereof. Under the control of the IF/ECC controller 22, the data accumulated in the buffer memory 23 are finally assembled every fixed-length unit corresponding to 40 tracks of a magnetic tape which is called as a group (Group). The data of each group are subjected to ECC format processing.

As the ECC format processing, recording data is added with an error correction code, subjected to modulation processing so as to be suitably magnetically recorded, and then supplied to an RF processor 19.

In the RF processor 19, the recording data thus supplied are subjected to processing of amplification, recording equalization, etc. to generate a recording signal, and then supplied to recording heads 12A, 12B, whereby the recording of the data from the recording heads 12A, 12B on the magnetic tape 3 is performed.

A data reproducing operation will be briefly described. The recording data of the magnetic tape 3 are read out as REF reproduction signals by reproducing heads 13a, 13B, and the reproduction outputs thereof are subjected to reproduction equalizing, reproduction clock generation, conversion to binary values, decoding (for example, Viterbi decoding), etc. in the RF processor 19.

The signals thus read out are supplied to the IF/ECC controller 22, and first subjected to the error correction processing, etc. Then, the signals are temporarily accumulated in the buffer memory 23, read out at a predetermined time and supplied to the compression/expansion circuit 21.

In the compression/expansion circuit 21, on the basis of the judgment of the system controller 15, if the data are the subjected to the compression by the compression/expansion circuit 21 in the recording operation, the data are subjected to the expansion processing. If the data are non-compression data, the data are directly output with performing no data expansion processing.

The output data of the compression/expansion circuit 21 are output to the host computer 40 as reproduction data through the SCSI interface 20.

Figure 3:
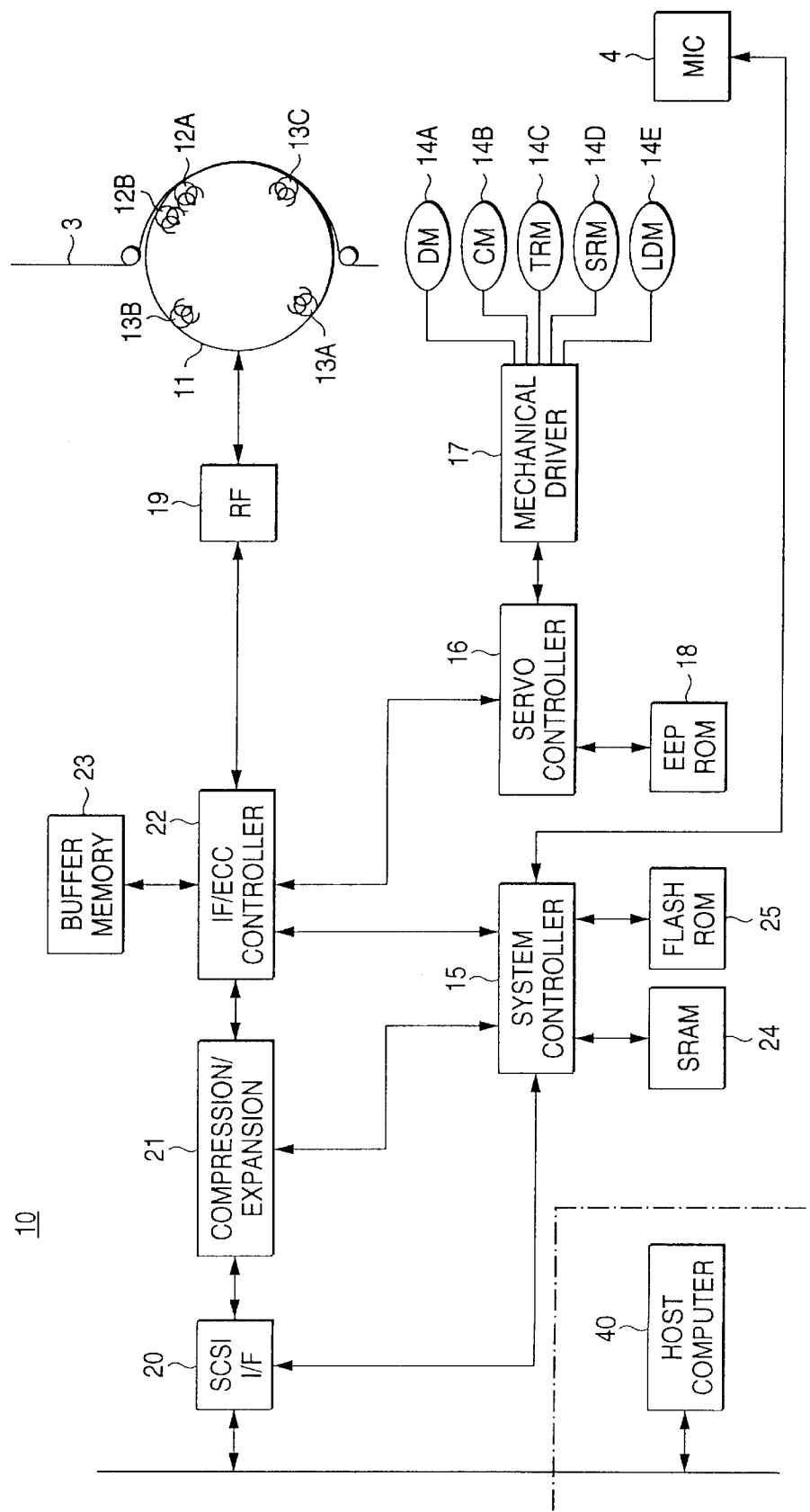
FIG. 3 is a block diagram showing a tape streamer drive of an embodiment of the present invention.

In FIG. 3, the magnetic tape 3 of the tape cassette 1 and MIC 4 are shown. When the body of the tape cassette is loaded into the tape streamer drive, the MIC 4 is connected to the system controller 15 through the terminal pin shown in FIG. 3 so that the data can be input/output therethrough, whereby the system controller 15 can read in and renew management information recorded in the MIC 4.

Information is mutually transmitted between the MIC 4 and an external host computer 40 by using a command of SCSI. Therefore, it is unnecessary to provide a special-purpose line between the MIC 4 and the host computer 40, and as a result the data delivery between the tape cassette and the host computer 40 can be conducted by only the SCSI interface.

As described above, the information is mutually transmitted between the tape streamer drive 10 and the host computer 40 by using the SCSI interface 20, and the host computer 40 can perform various kinds of communications with the system controller 15 by using the SCSI command.

Accordingly, the host computer 40 instructs the system controller 15 with the SCSI command to execute the data write-in/read-out operation on the MIC 4.

S-RAM 24, flash ROM 25 store data which the system controller 15 uses to perform various processing.

For example, constants, etc. used for the overall control of the system are stored in the flash ROM 25. S-RAM 24 is used as a work memory, or it is used as a memory to store the data read out from the MIC 4, the data to be written in the MIC 4, mode data set every tape cassette, various flag data, etc. and perform operation processing.

The S-RAM 24 and the flash ROM 25 may be constructed as an internal memory of a microcomputer constituting the system controller 15. Further, a part of the area of the buffer memory 23 may be used as a work memory.

3. Data Structure on Magnetic Tape

Next, the data format on the magnetic tape 3 of the tape cassette 1 for which the recording/reproduction is carried out by the tape streamer drive 10 described above will be briefly described.

FIGS. 4A to 4D shows the structure of the data recorded in the magnetic tape 3. FIG. 4A schematically shows one magnetic tape 3. In this embodiment, it is assumed that one magnetic tape 3 can be used while divided on a partition (Partition) basis as shown in FIG. 4A, and in the case of the system of this embodiment, the number of partitions can be set to 256 at maximum for management. Further, the respective partitions as shown in this figure are managed while being supplied with partition numbers as written as partition #0, #1, #2, #3, etc.

Accordingly, in this embodiment, the data recording/reproduction, etc. can be performed independently every partition. For example, the recording unit of data within one partition shown in FIG. 4B can be divided into units of fixed length which are called as groups (Group) shown in FIG. 4C, and the recording on the magnetic tape 3 can be performed on a group basis.

In this case, one group corresponds to the data amount of 20 frames (Frame), and as shown in FIG. 4D, one frame is constructed by 2 tracks (Track). In this case, two tracks constituting one frame are set as plus azimuth and minus azimuth which are adjacent to each other. Accordingly, one group is constructed by 40 tracks.

Figure 5A:
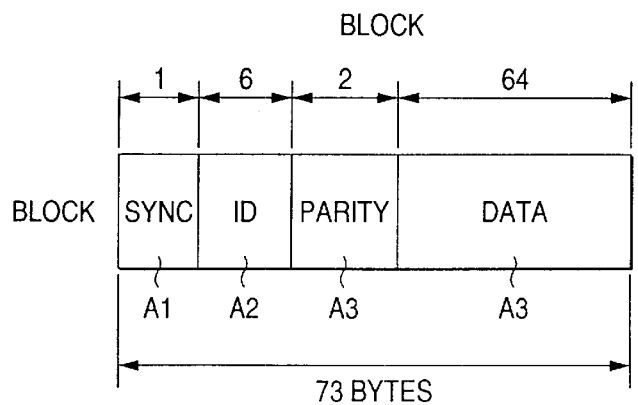
FIGS. 5A to 5C are schematic diagrams showing the data structure of one track.
Figure 5B:
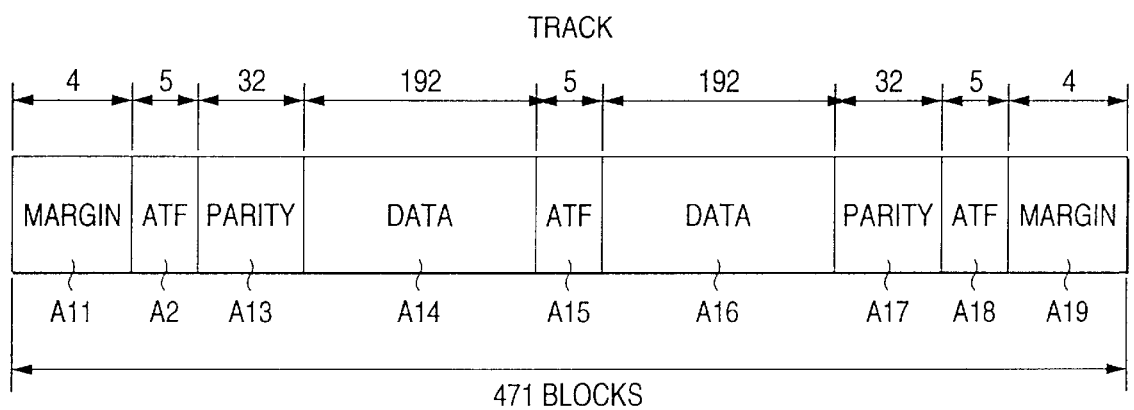

The data structure of one track shown in FIG. 4D is shown in FIGS. 5A and 5B. FIG. 5A shows the data structure of a block (Block) unit. One block is constructed by a 1-byte SYNC data area A1, a 6-byte ID area A2 which is subsequent to the 1-byte SYNC data area A1 and used for search, etc., a 2-byte error correcting parity area A3 for ID data and a 64-byte data area A4.

The data of one track shown in FIG. 5B is constructed by 471 blocks. As shown in the figure, one track is provided with margin areas A11, A19 of 4 blocks at both ends thereof, and ATF areas A12, A18 for tracking control are provided at the rear side of the margin area A11 and at the front side of the margin A19. Further, parity areas A13, A17 are provided at the rear side of the ATF area A12 and at the front side of the ATF area A18. An area of 32 blocks is provided as each of the parity areas A13, A17.

An ATF area A15 is provided in the middle of one track, and a 5-block area is provided to each of these ATF areas A13, A15 and A18. Data areas A14 and A16 of 192 blocks are provided between the parity area A13 and the ATF area A15 and between the ATF area A15 and the parity area A17. Accordingly, all the data areas (A14 and A16) in one track occupy 192×2=384 blocks out of all of 471 blocks.

Figure 5C:
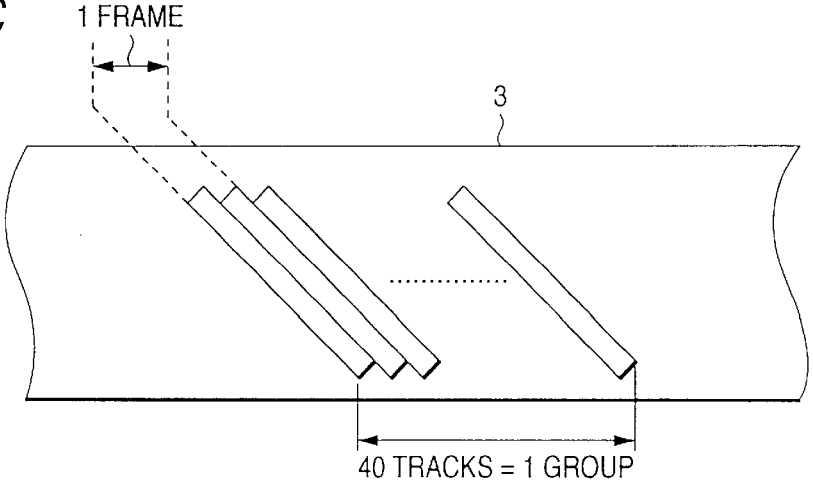

The above track is physically recorded on the magnetic tape 3 as shown in FIG. 5C, and 40 tracks (=20 frames) constitute one group as described above.

Figure 6A:
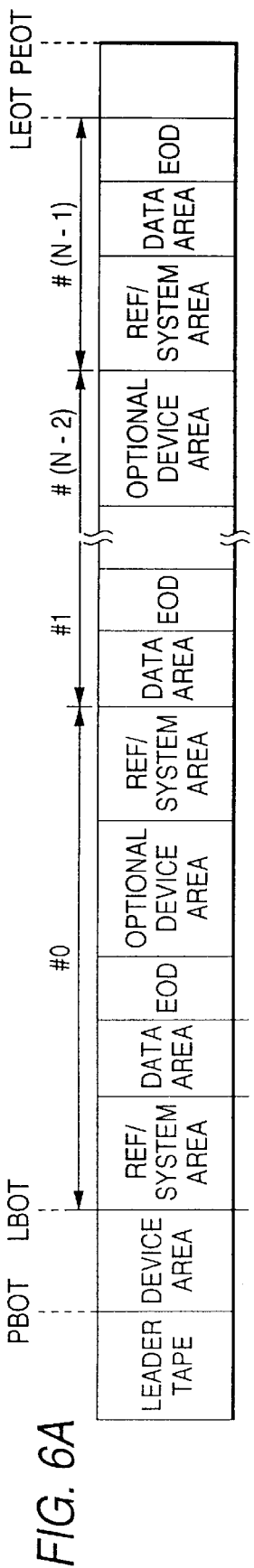
FIGS. 6A to 6C are diagrams showing the area construction on the magnetic tape.
Figure 6B:
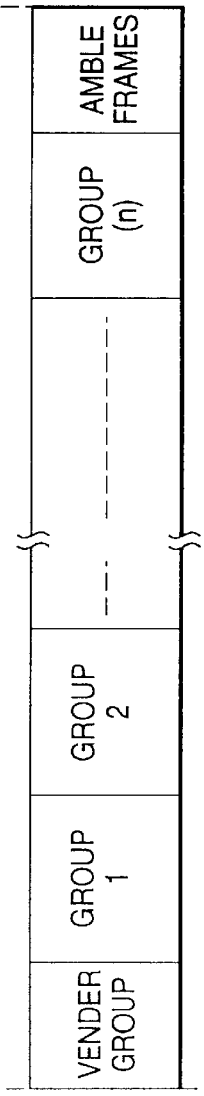
Figure 6C:
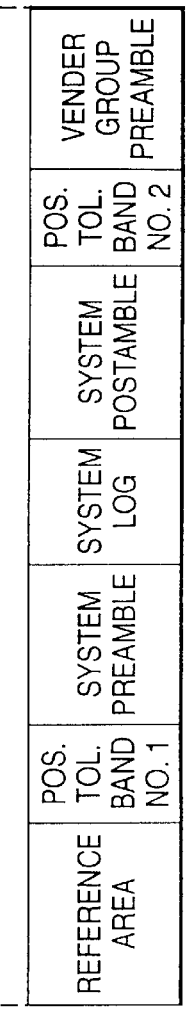

The data recording is performed on the magnetic tape 3 shown in FIGS. 4, 5 on the basis of the area structure shown in FIGS. 6A to 6C.

In this case, the number of partitions is limited to N from #0 to #N-1.

As shown in FIG. 6A, at the first portion of the magnetic tape, a leader tape is physically located at the head thereof, and subsequently a device area serving as a loading/unloading area of the tape cassette is provided. The head of the device area is set as the head position PBOT (Physical Beginning of Tape) of the physical tape.

Subsequently to the device area, a reference area on the partition #0 and a system area in which past use record information of the tape, etc. are stored (hereinafter referred to as system area containing the reference area) is provided, and subsequently a data area is provided. The head of the system area is set as the start position LBOT (Logical Beginning of Tape) of the physical tape.

As shown in a large scale in FIG. 6C, in the system area are formed a reference area, a position tolerance band NO. 1, a system preamble, a system log, a system post-amble, a position tolerance band NO. 2, and a vendor group preamble.

In the data area subsequent to the system area as described above, as shown in a large scale in FIG. 6B, a vendor group indicating information on a vendor which first creates and supplies data is provided, and subsequently a group shown in FIG. 4C, in this case, a plurality of groups represented by group 1 to group (n) are sequentially formed. An amble frame is disposed subsequently to the group (n).

Subsequently to such a data area, an area of EOD (End of Data) indicating the end of the data area of the partition is provided as shown in FIG. 6A.

When only one partition is formed, the end of EOD of the partition #0 is set as the end position LEOT (Logical End of Tape) of the logical tape. However, in this case, partitions of N are formed, and thus an optional device area is formed subsequently to EOD of the partition #0.

The device area from the head position PBOT is an area for performing the load/unload corresponding to the partition #0, however, the final optional device area of the partition #0 becomes an area for performing the load/unload corresponding to the partition #1.

With respect to the partition #1, an area is constructed as in the case of the partition #0. At the end thereof is formed an optional device area serving as an area for performing the load/unload corresponding to the next partition #2. Subsequently, partitions until the partition # (N-1) are formed likewise.

In the last partition #(N-1), any optional device area is not required and thus no optional device area is formed. The end of EOD of the-partition #(N-1) is set as the end position LEOT (Logical End of Tape) of the logical tape.

PEOT (Physical End of Tape) indicates the end position of the physical tape, or the physical end position of the partition.

4. Data structure of MIC

Next, the data structure of MIC 4 provided to the tape cassette 1 will be described.

Figure 7:
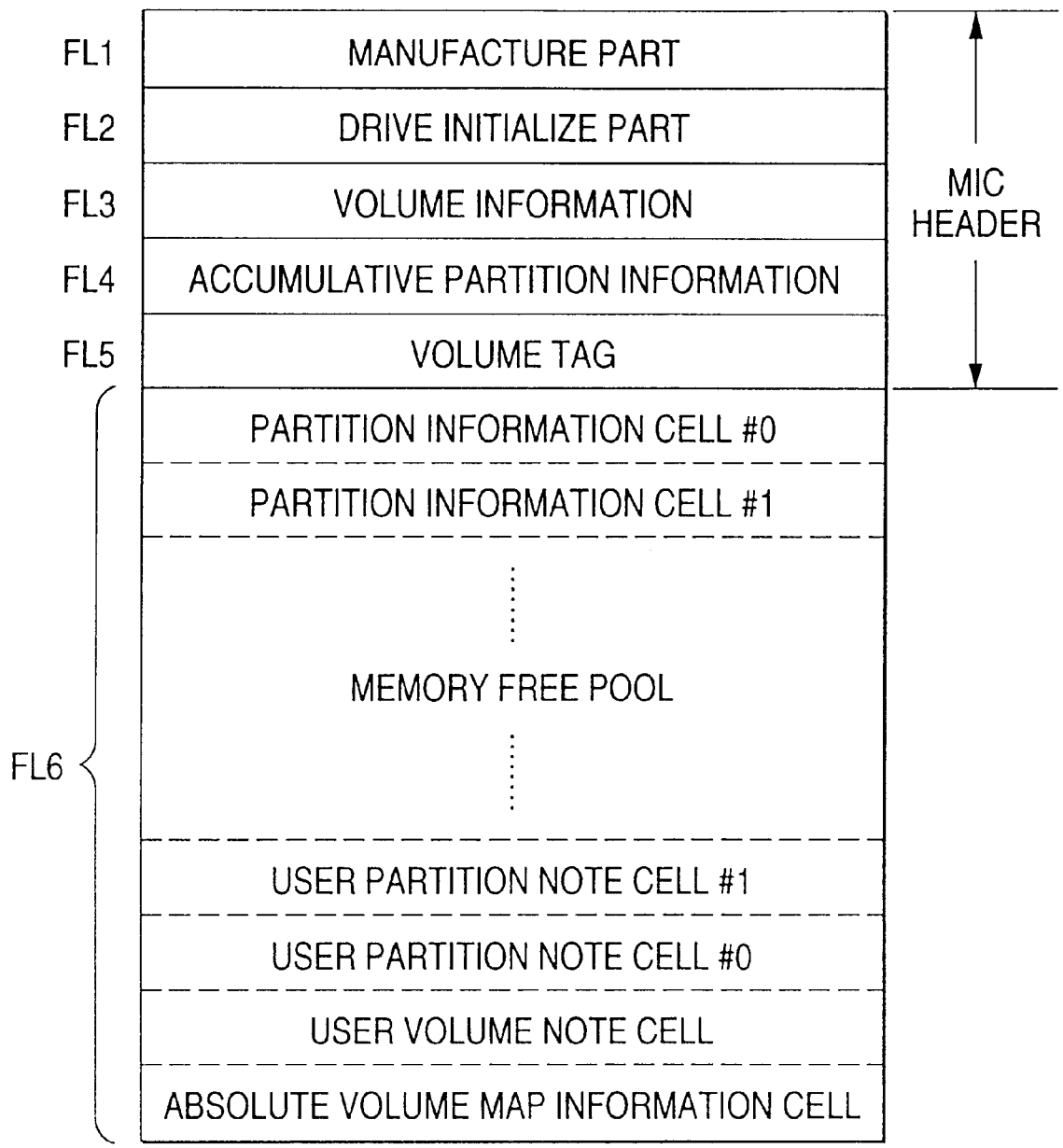
FIG. 7 is a diagram showing the data structure of MIC of the embodiment.

FIG. 7 schematically shows an example of the structure of data stored in MIC 4. Fields FL1 to FL6 are set as a storage areas of MIC 4.

Various information at the time of manufacturing the tape cassette, including tape information at the time of initialization, and information of each partition, etc. are written in these fields FL1 to FL6.

The field FL1 is set as a manufacture part, and various information at the time of manufacturing the tape cassette is mainly stored therein.

The field FL2 is set as a drive initialize part, and information at the initialization time, etc. are stored therein.

The field FL3 is set as a volume information, and basic management information of the overall tape cassette is stored therein.

The field FL4 is set as an accumulative partition of information, and past record information from the manufacturing time of the tape cassette is stored therein.

In the Field FL5 is stored each information as a volume tag.

The field FL6 is set as a memory free pool area, and management information can be additionally stored. The process of the recording/reproducing operation, and if necessary, various information are stored in the memory free pool. One unit data group to be stored in the memory free pool is referred to as a "cell".

First, in connection with a partition formed in the magnetic tape 3, partition information cells #0, #1, . . . serving as the management information corresponding to each partition are successively written from the head side of the memory free pool. That is, the partition information cells are formed as cells whose number is equal to that of the partitions formed on the magnetic tape 3.

Absolute volume map information cell serving as map information for high-speed search is written from the rear end side of the memory free pool.

Subsequently, a user volume note cell and a user partition note cell are written from the rear end side. The user volume note cell is information such as a comment, etc. which are input on the overall tape cassette by a user, and the user partition note is information such as a comment, etc. which are input on each partition by the user. Accordingly, these are stored when the user instructs the write-in operation, and all of this information is not necessarily described.

Further, a middle area in which this information is not stored is left for subsequent writing as the memory free pool.

The manufacture part of the field FL1 is structured as shown in FIG. 8, for example. The size of each data (byte number) is shown at the right side.

In the manufacture part, information of checksum for the data of the manufacture part is stored as manufacture part checksum at the head of 1 byte. The information of the manufacture part checksum is given at the manufacturing time of the cassette.

Data from MIC type (mic type) to a write protect byte count are described as real data constituting the manufacture part. Reserve indicates a preliminary area for storing data in the future. The same is satisfied in FIGS. 9 to 13.

A MIC type is data indicating the type of MIC which is really provided to the tape cassette.

A MIC manufacture date indicates the manufacture year, month and date (and time).

A MIC manufacture line name indicates information on the name of a manufacturing line for MIC.

A MIC manufacture plant name indicates the information on the name of a factory in which MIC is manufactured.

A MIC manufacturer name indicates the information on a manufacturing company of MIC.

A MIC name indicates the information on the name of a vendor of MIC.

The information of the cassette itself which is similar to the information on MIC described above is described in each of a cassette manufacture date, a cassette manufacture line name, a cassette manufacture plant name, a cassette manufacturer name, a cassette name.

As OEM customer name is stored information on the name of a partner company of OEM (Original Equipment Manufactures).

As a physical tape characteristic ID is indicated the information on physical characteristics of a magnetic tape such as the material of the tape, the tape thickness, the tape length, etc.

As the maximum clock frequency is stored the information indicating the maximum clock frequency corresponding to the MIC.

In a maximum write byte count/cycle, information as to what bytes can be recorded once is indicated as the characteristics of MIC, for example. This information is dependent on the physical characteristics of a non-volatile memory used as MIC.

As MIC capacity is indicated the storage capacity information of MIC concerned is indicated.

A write protect top address is used to prohibit writing into a desired partial area of MIC, and indicates the start address of the writing-prohibited area.

A write protect byte count indicates the number of bytes in the writing-prohibited area. That is, an area which is occupied from an address indicated by the write protect top address on the basis of the byte number indicated by the area of the write protect count is set as a writing-prohibited area.

Figure 9:
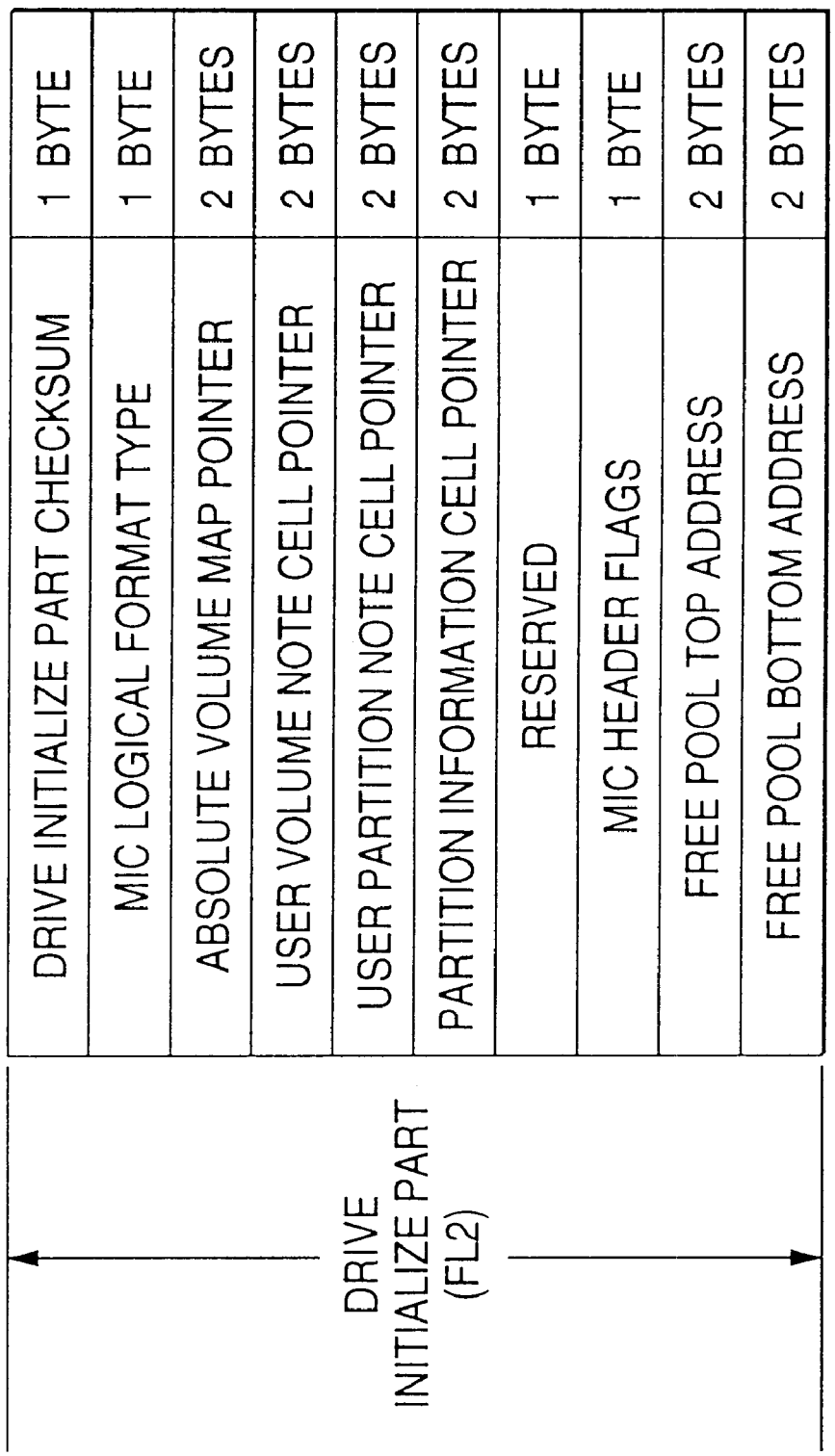
FIG. 9 is a diagram showing a drive initialize part of MIC of the embodiment.

Next, the structure of the drive initialize part of the field FL2 of FIG. 7 will be described with reference to FIG. 9. The size (byte number) of each data is shown at the right side.

In the drive initialize part, information of checksum to the data of the drive initialize part is first stored as the drive initialize part checksum.

Information from an MIC logical format type is stored until a free pool button address is described as real data constituting the drive initialize part.

First, the ID number of a logical format of MIC is stored as the MIC logical format type. As the MIC format exist not only a basic MIC format, but also various formats relevant to a firmware renewing tape MIC format, a reference tape MIC format, a cleaning cassette MIC format, etc., and the ID number corresponding to the MIC format of the tape cassette concerned is indicated.

A point indicating the head address of the area of an absolute volume map information cell of FIG. 7 is disposed in an absolute volume map pointer.

A user volume note cell pointer indicates a storage area in which data are freely readable and writable via SCSI, that is, the start address of the user volume note cell shown in FIG. 7.

A user partition note cell pointer indicates a storage area which data can be freely read/written from/into each partition via SCSI by a user, that is, the start address of the user partition note cell of FIG. 7. There is a case where a plurality of user partition note cells are provided, and the user partition note cell pointer indicates the start address of the head cell of the plural user partition note cells.

The partition information cell pointer indicates the start address of the partition information cell #0 of FIG. 7.

There are formed partition information pieces to be written into the memory free pool, the number of which corresponds to the number of partitions to be formed in the magnetic tape 3. All the partition information cells #0 to #N are linked to one another on the basis of a link structure by a pointer. That is, the partition information cell pointer is set as a route indicating the address of the partition #0, and a pointer of a subsequent partition information cell is disposed in a just-before partition information cell. This link structure will be described later with reference to FIGS. 14, 15.

As described above, each data position within the field FL6 is managed by each pointer (absolute volume map pointer, user volume note cell pointer, user partition note cell pointer, partition information cell pointer).

An MIC header flag is set to an 1-byte flag to supply a logical writing-prohibiting tab to MIC 4. That is, the content indicated by the MIC header flag includes write-in permission/prohibition of the manufacture part portion, or write-in permission/prohibition of a portion other than the manufacture part.

The free pool top address and the free pool bottom address indicate the start address and the end address of the memory free pool at that time in the field FL6. The area as the memory free pool is varied in accordance with the writing or deletion of the partition information, the user partition note or the like, so that the free pool top address or the free pool bottom address is renewed.

Subsequently, the structure of the volume information of the field FL3 of FIG. 7 will be described with reference to FIGS. 10A and 10B.

As shown in FIG. 10A, in the volume information, information of checksum for the data of the volume information is stored as the volume information checksum at the head of 1 byte.

As real data constituting the volume information are described an eject status of 20 bytes, a reel diameter of 4 bytes, an initialize count of 3 bytes, and a volume information on tape of 72 bytes.

The eject status describes the logical position information of the magnetic tape 3 when the tape cassette is unloaded, and the reel diameter indicates the diameter information of both the reel hubs 2A, 2B at the time when the tape cassette is unloaded.

The initialize count indicates frequency information of initialization of the magnetic tape 3.

The content of the volume information on tape is shown in FIG. 10B.

As shown in FIG. 10B, in the volume information on tape are described, except for an area serving as reserve, a 1-bit super high speed search enable flag, a 2-bit system log allocation flag, a 1-bit always unload PBOT flag, a 1-byte AIT/DDS flag, a 1-byte last valid partition number, and a 32-byte optional device area allocation map.

The super high speed search enable flag is a flag indicating whether a function of further increasing the speed of the high-speed search is made effective or not by using the table position information stored as the absolute volume map of MIC 4.

The system log allocation flag is a flag indicating where the past use record of the tape cassette (system log) is stored, and it is designed to identify whether the past user record is recorded only on the magnetic tape 3, neither in the magnetic tape 3 nor in the MIC 4, both in the magnetic tape 3 and in MIC 4, or only in the MIC 4.

The always unload PBOT flag is a flag indicating that even when a multipartition is formed on the magnetic tape 3 and the optional device area exists in the partition, unload is carried out in the device area existing in PBOT. The AIT/DDS flag is a flag indicating the mode of the tape cassette 1. The last valid partition number indicates the number of the last partition formed.

The optional device area map comprises 256 bits, and 1 bit corresponds to each partition formed on the magnetic tape 3. When the value of the bit is set to "1", it indicates that an optional device area is formed in the partition corresponding to the bit concerned.

Next, the cell stored in the field FL 6 will be described.

As described above, the partition information cell, the user partition note cell, etc. are stored in the field FL 6.

The structure of each of these cells is shown in FIGS. 11A and 11B.

As shown in FIG. 11A, one cell comprises 8-byte link information and data of n bytes (varied in accordance with the cell type).

8-byte link information is provided to each cell, and the structure thereof is shown in FIG. 11B.

First, 1-byte cell checksum is provided as checksum on data within a cell.

Further, the size of the cell is shown as the cell size of 2 bytes.

A previous cell pointer and a next cell pointer are actual linkage data (data for constructing the link structure), and when a plurality of same types of cells are linked, previous and next cells are indicated by the previous cell pointer and the next cell pointer.

The cell having such a structure exists the partition information cell, the absolute volume map information cell, the user volume note cell and the user partition note cell. The cell size of the partition information is a fixed value. The cell size of the other cells is of a variable value.

The partition information cell whose cell size is set to a fixed value will be described with reference to FIGS. 12, 13.

The partition information cell comprises 8-byte link information and 56-byte data as shown in FIG. 12. 8 bytes out of the 56-byte data are allocated as a partition memo, and 48 bytes are allocated as partition information.

Various information on the past use record of the magnetic tape in the partition corresponding to the cell is stored in the partition information (system log), and used as information to manage the recording/reproducing operation of the tape streamer drive.

The data structure of the partition information within one partition information cell which corresponds to some partition is defined as shown in FIG. 13, for example.

In the previous groups written of 4 bytes is indicated information on the number of groups within the partition concerned, which have been physically recorded in the magnetic tape since the last renewal of the partition information concerned.

In total groups written of 4 bytes is indicated the total number of groups which have been recorded in the partition concerned until now. This value is accumulated until the tape cassette is unusable or wasted because of the end of its lifetime.

In the previous groups written and the total groups written, for example if data are being recorded in the magnetic tape 3 by the tape streamer drive, the value of the area thereof is incremented in accordance with the number of groups to be newly recorded by the current recording operation through the processing of the system controller 15 of the tape streamer drive.

In previous groups read of 3 bytes is indicated the number of groups which have been physically read out since the last renewal of the partition information.

In total groups read of 4 bytes is indicated a value obtained by accumulating the number of groups which have been read out from the partition concerned until now.

A total rewritten frames of 3 bytes indicates an accumulation value of the number of frames for which rewriting is requested on the basis of READ-AFTER-WRITE (hereinafter abbreviated as RAW) in the partition concerned.

In the tape streamer drive of this embodiment, the data of a frame which is written in the magnetic tape 3 as RAW operation are read out by the reproducing head 13C just after. The data of a frame read out by RAW are subjected to error detection by the system controller 15, and when it is detected that an error occurs, the recording system is controlled to rewrite the data of a frame in which the error occurs. In such a case, the accumulation value of the number of frames which are subjected to data rewriting is set as a total rewritten frame.

In a total 3rd ECC count is indicated an accumulation value of the number of groups on which an error correction is conducted by using C3 parity in the partition concerned.

In the tape streamer drive system of this embodiment, the error correction is conducted on data read out from the magnetic tape 3 by parities of C1, C2, C3, and the C3 parity is used when the data cannot be restored by only the C1, C2 parities.

In an access count of 4 bytes is indicated a frequency at which the partition concerned on the magnetic tape is accessed by the tape streamer drive. The access of this case means a physically passing frequency of the partition concerned, that is, the frequency at which the recording or reproduction of the partition is performed and the passing frequency are contained.

In an update replace count of 4 bytes is indicated information of accumulation of a frequency of replacing data to the magnetic tape in the partition concerned by update. That is, it is a renewal frequency to the partition concerned.

In a previous rewritten frames of 2 bytes is indicated information of the number of frames within a partition for which the data rewriting request is made, counted from the time when the partition information concerned is finally renewed by RAW described previously.

In a previous 3rd ECC count of 2 bytes is indicated the number of groups which have been subjected to error correction by using the C3 parity, counted from the time when the partition information is finally renewed.

In a load count of 3 bytes is indicated an accumulation value of a frequency of loading a tape.

In a valid maximum absolute frame number of 3 bytes is indicated information of a frame count until the last frame which is effective in the partition concerned.

In a last maximum absolute frame count of 3 bytes in the partition information is indicated information of the last frame count of the partition concerned.

In a flag byte of 1 byte is defined the flag content on each bit as follows.

That is, as prevent write, prevent read, prevent write retry, prevent read retry are prepared write permission/prohibition and read permission/prohibition for the partition concerned, data rewriting permission/prohibition based on RAW in the recording operation, and retry permission/prohibition of data read-out in the reproducing operation, respectively.

As partition-is-opened is prepared a flag which is set during recording in the partition concerned and reset in accordance with the end of the recording.

Next, a link configuration of each cell stored in the field FL6 will be described with reference to FIGS. 14, 15.

As described above, the position of each cell in the field FL6 is managed by each pointer in the field FL2 (absolute volume map pointer, user volume note cell pointer, user partition note cell pointer, partition information cell pointer).

Figure 14:
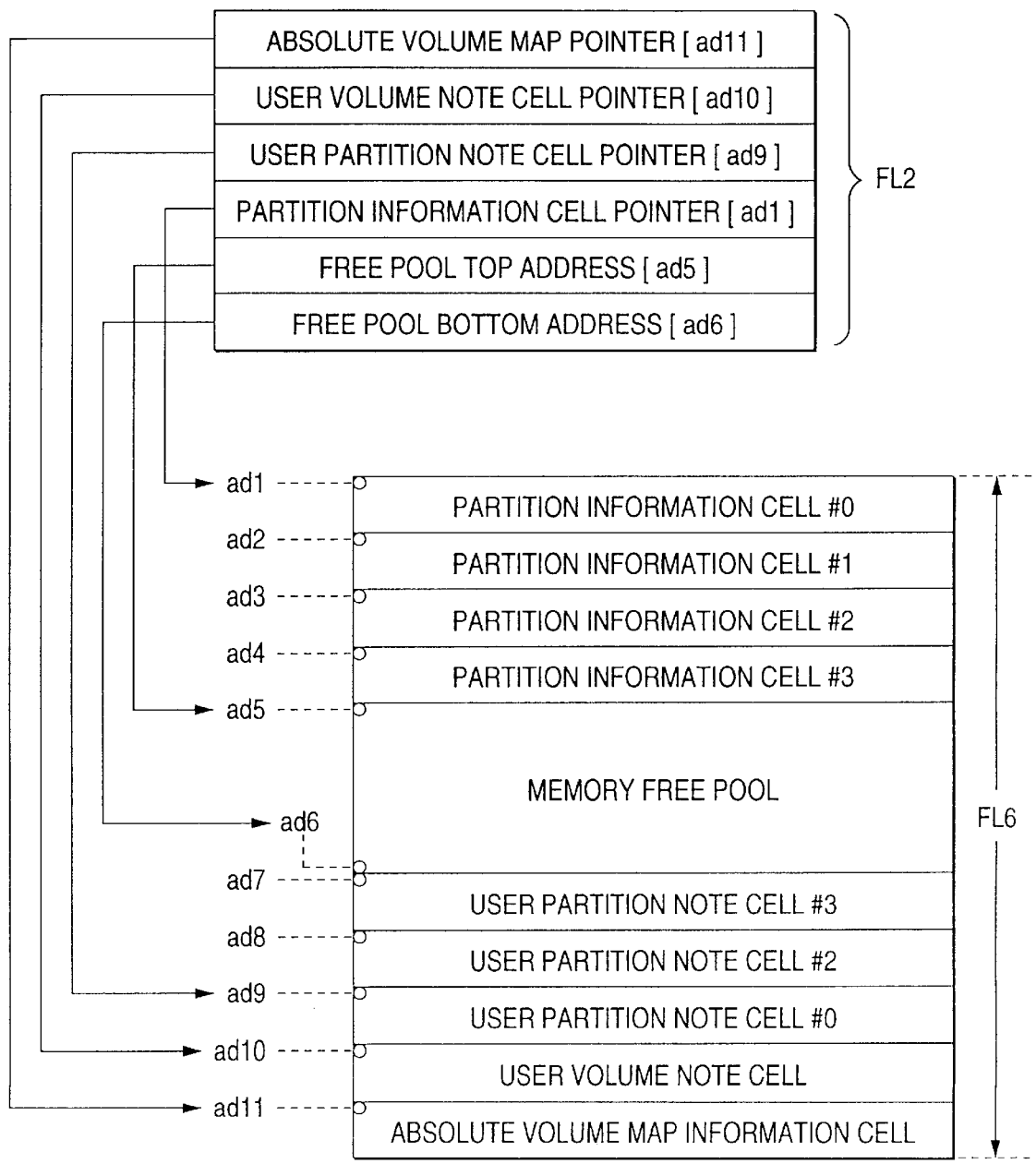
FIG. 14 is a diagram showing linkage data of MIC of the embodiment.

Assuming that four partitions #0 to #3 are formed on the magnetic tape 3, the partition information cells #0 to #3 are stored in the field FL6 as shown in FIG. 14.

Further, it is assumed that the absolute volume map information cell, the user volume note cell and the user partition note cells #0, #2, #3 are stored in the field FL6 as shown in the figure.

The head addresses of the respective partition information cells #0 to #3 are set to ad1, ad2, ad3, ad4 as shown in the figure.

The head address of the absolute volume map information cell is set to ad11; the head address of the user volume cell is set to ad10; and the head addresses of the respective user partition note cells #0, #2 and #3 are set to ad9, ad8 and ad7, respectively.

Further, the head address as the remaining memory free pool is set to ad5, and the rear end address thereof is set to ad6.

In this state, data as the free pool top address within the field FL2 is set to "ad5", and data as the free pool bottom address is set to "ad6", thereby managing an area in which no real data cell is formed within the field FL6.

The value of the absolute volume map pointer within the field FL2 is set to "ad11", and the position as the absolute volume map information cell within the field FL6 is managed.

Further, the value of the user volume note cell pointer within the field FL2 is set to "ad10", thereby managing the position of the user volume note cell within the field FL6.

With respect to the user partition note cell and the partition information cell in which a plurality of cells of the same kind are formed, the position of the head cell thereof is indicated by a pointer in the field FL2.

That is, the value of the partition information cell pointer within the field FL is set to "ad1" to indicate the position of the first partition information cell #0 within the field FL6.

The value of the user partition note cell pointer within the field FL2 is set to "ad9" to indicate the position of the first user partition note cell #0 within the field FL6.

The second and subsequent partition information cells #1 to #3 which are not indicated by the partition information cell pointer, and the second and subsequent user partition note cells #2 and #3 which are not indicated by the user partition note cell pointer are managed by linking previous and next cells to each other on the basis of the link information within each cell as described above.

Figure 15A:
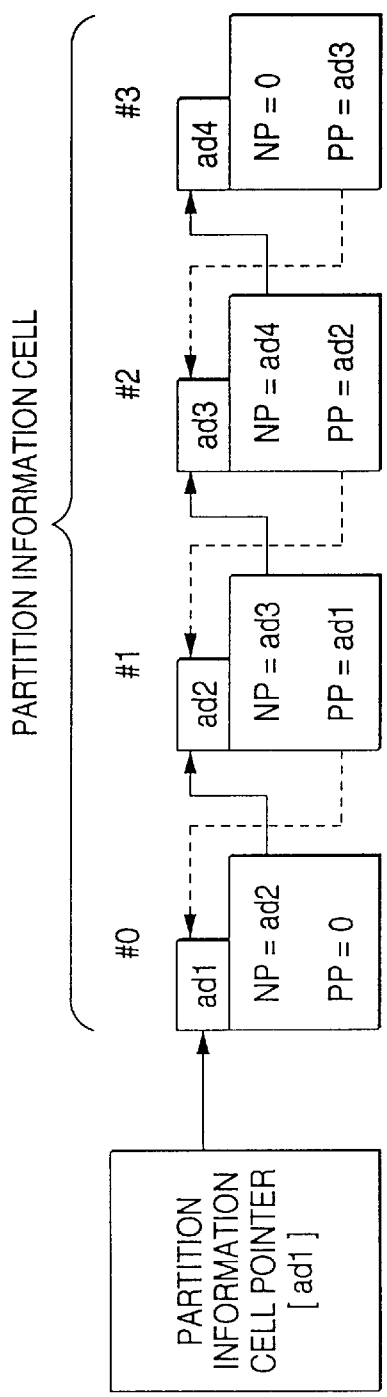
FIGS. 15A and 15B are diagrams showing a cell link based on linkage data of MIC of the embodiment.
Figure 15B:
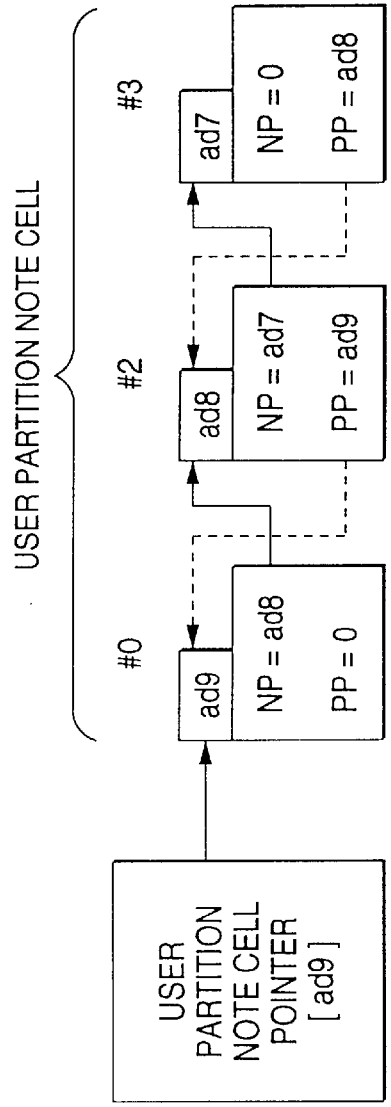

This state is shown in FIGS. 15A and 15B. In FIGS. 15A and 15B, "NP" "PP" represent the next cell pointer and the previous cell pointer described with reference to FIGS. 11A and 11B.

FIG. 15A shows the link configuration of the partition cell information cell. In the first partition information cell #0 indicated by the-partition information cell pointer, it is set that the next cell pointer NP=ad2, thereby indicating the position of the partition information cell #1. Further, the next cell pointer NP of the partition information cell #1 is set to ad3, thereby indicating the position of the next partition information cell #2. The next cell pointer NP of the partition information cell #2 is set to ad4, thereby indicating the position of the next partition information cell #3. In this last partition information cell #3, the next cell pointer NP is set to 0 (NO LINK) because any next cell to be linked does not exist.

In the last partition information cell #3, the previous cell pointer PP is set to "ad3", thereby indicating the position of the just-before partition information cell #2. In the partition information cell #2, the previous cell pointer PP is set to "ad2", thereby indicating the just-before partition information cell #1. Further, in the partition information cell #1, the previous cell pointer PP is set to "ad1", thereby indicating the position of the just-before partition information cell #0.

As described above, the respective partition information cells are managed while previous and next cells are linked to each other by the next cell pointer and the previous cell pointer.

FIG. 15B shows the link configuration of the user partition note cell. In the first user partition note cell #0 indicated by the user partition note cell pointer, the next cell pointer is set to ad8, thereby indicating the position of the next user partition note cell #2. The next cell pointer NP of the user partition note cell #2 is set to ad7, thereby indicating the position of the next user partition note cell #3. In the last user partition note cell #3, the next cell pointer NP is set to 0 (NO LINK) because any next cell to be linked does not exist.

In the last user partition note cell #3, the previous cell pointer PP is set to "ad8", thereby indicating the position of the just-before user partition note cell #2. In the user partition note cell #2, the previous cell pointer PP is set to "ad9", thereby indicating the just-before user partition note cell #0.

As described above, the respective user partition note cells are managed while previous and next cells are linked to each other by the next cell pointer and the previous cell pointer.

As described above, with respect to each cell stored in the field FL6, the address thereof is managed by the pointer in the field FL2, and when plural cells are linked, previous and next cells can be grasped by the link information.

The link structure is constructed as described above to manage each cell, thereby enabling cell addition, renewal, etc. For example, addition or deletion of a partition on the magnetic tape 3 follows addition or deletion of a partition information cell, and at this time the cell structure is renewed while the link configuration constructed by the pointers and the link information is traced.

As described above, the data structure within MIC 4 is constructed as described with reference to FIGS. 7 to 15. However, this data structure of MIC 4 is an example, and the arrangement of data, the area setting, the data content, the data size, etc. are not limited to the above example.

5. Format Processing based on Storage Capacity of MIC

Figure 16:
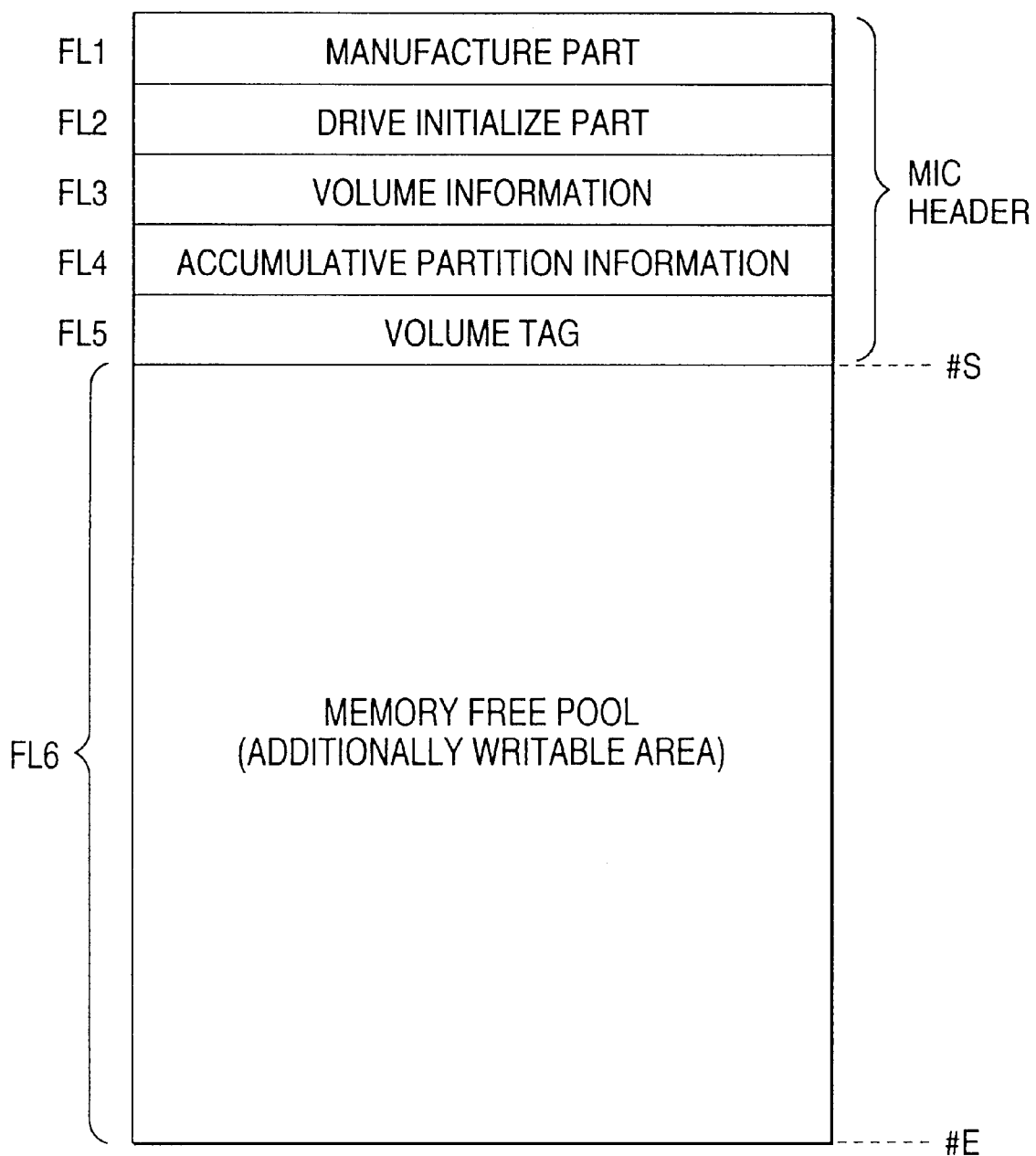
FIG. 16 is a diagram showing the state of the memory free pool before the format of MIC of the embodiment.

FIG. 16 shows a state of MIC 14 in which the tape cassette 1 is not formatted by the tape streamer drive 10. In the state before the formatting in FIG. 16, with respect to the MIC header portion (fields FL1 to FL5) shown in FIG. 7 in MIC 4, desired initial data are stored. However, with respect to the field FL6, all are set as memory free pool (additionally writable area).

That is, the head address "#S" of the memory free pool subsequent to the MIC header portion is fixed, and the end address "#E" of the field FL6 corresponds to the free pool bottom address on the basis of the storage capacity of MIC 4. As described above, before the formatting, the head address "#S" corresponds to the free pool top address, and the end address "#E" corresponds to the free pool bottom address. That is, the end address "#E" is set to the value corresponding to the storage capacity of MIC 4 indicated in a MIC capacity as described later.

Accordingly, in the prior art, the overall MIC 4 is accessed to perform the address search in order to detect the end address "#E" before the tape cassette 1 is formatted, for example. Usually, when the address search is performed, it is necessary to access (read, write) MIC 4 at plural times, and a processing load as preprocessing of the formatting is large.

Therefore, according to the present invention, the storage capacity of the MIC 4 concerned can be recognized on the basis of the storage capacity information indicated in the MIC capacity of the manufacture part (field FL1) of the MIC header. The end address "#E" of the field FL6 based on the storage capacity of MIC 4 which is recognized from the MIC capacity can be set as an initial value of the free pool bottom address.

As described above, by detecting the MIC capacity when the tape cassette 1 is loaded into the tape streamer drive 10, the storage capacity of the overall MIC 4 can be identified without performing the address search of the overall MIC 4. Accordingly, the access processing such as the address search which has been conventionally performed can be omitted, and the shift to the format processing of MIC 4 can be quickly performed.

Figure 17:
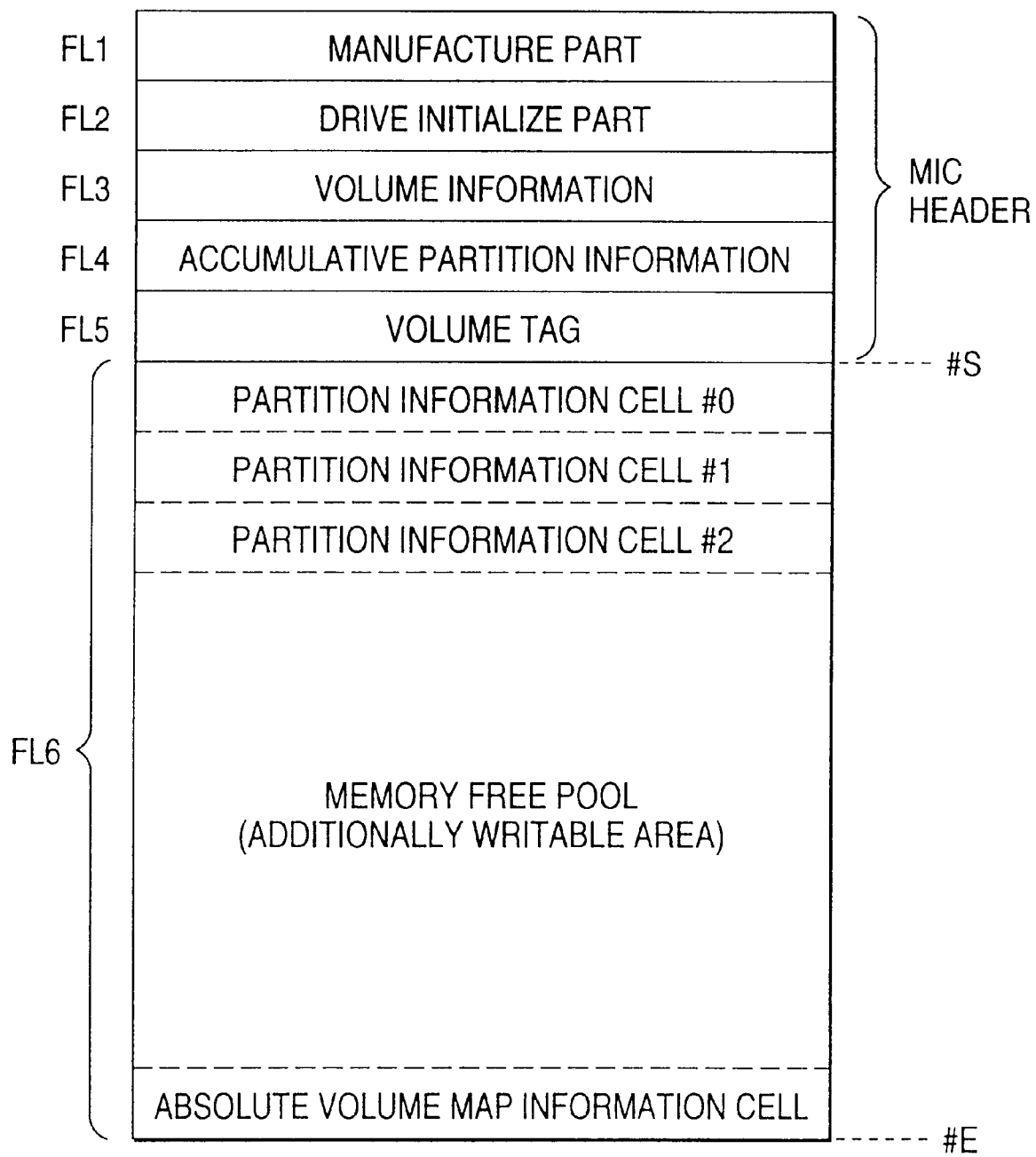
FIG. 17 is a diagram showing the memory free pool and the cell status after the format of MIC of the embodiment.

The state of MIC 4 after the format is carried out is shown in FIG. 17. In the case shown in FIG. 17, it is assumed that three partitions are set to execute the format and partitions #0, #1, #2 are formed on the magnetic tape 3.

By forming the partitions, the partition information cells #0, #1, #2 corresponding to the partitions #0, #1, #2 are stored from the head side of the field FL6. Further, the absolute volume map information cells are written from the rear end side of the field FL6, whereby the free pool top address and the free pool bottom address are renewed.

As shown in FIG. 17, when the tape cassette 1 is formatted again after the partition information cell and the absolute volume map information cell are formed and thus the free pool top address and the free pool bottom address are renewed, the end address "#E" of the field FL6 based on the storage capacity of MIC 4 is set as an initial value of the free pool bottom address.

As described above, the storage capacity of MIC 4 can be detected from the MIC capacity, so that the number of partition information cells which can be formed on the basis of the storage capacity can be grasped. That is, at the time when the MIC capacity is detected (before the format is started), the number of partitions which can be formed on the magnetic tape 3 of the tape cassette 1 concerned can be grasped.

Figure 18:
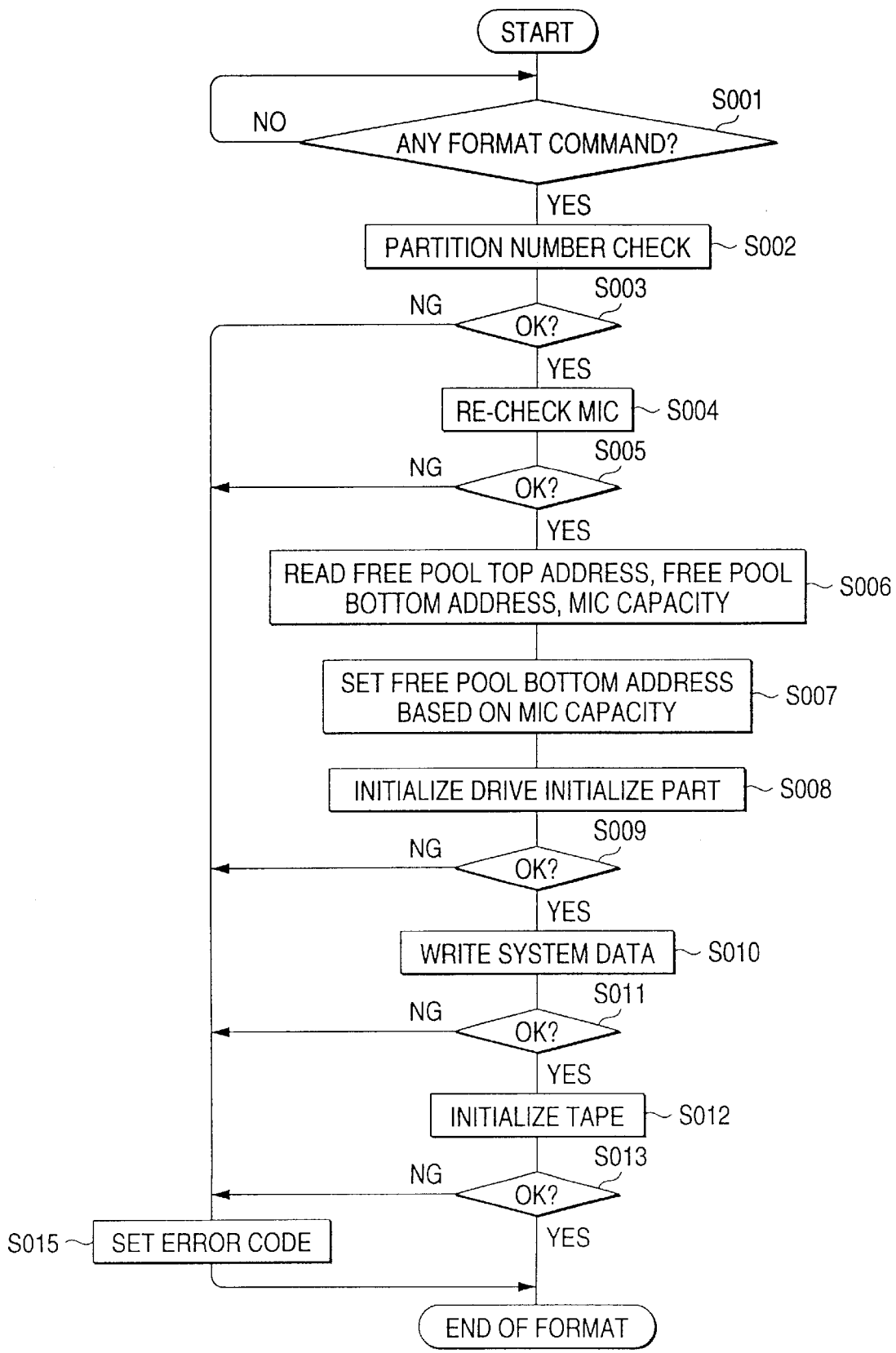
FIG. 18 is a flowchart showing the processing transition of the format of MIC of the embodiment.

FIG. 18 is a flowchart showing a transition example of the processing which is executed by the system controller 15 when the tape cassette 1 is formatted. In the flowchart shown in FIG. 18, there is shown a transition from a state in which the tape cassette 1 has been already loaded in the tape streamer drive 10 and the check of MIC 4 at the loading time is finished. The check of MIC 4 is to read in the manufacture part or drive initialize part to identify, by desired judging process, whether the MIC 4 includes an error/errors and whether the MIC 4 is provided to the tape cassette concerned. Accordingly, the flowchart of this embodiment shows a shift case to the format under the state that MIC 4 is provided and further no error is detected.

When the tape cassette 1 is loaded into the tape steamer drive 10, the processing waits until a desired format command is supplied from a host computer 40 (S001). When it is judged that the format command is supplied, a partition number (the number of partitions to be formed) indicated by the format command is checked (S002). In this case, by using as a judgment reference the MIC capacity within the field FL1 which is detected by MIC check at the loading time, it can be immediately checked whether the partitions whose number is indicated by the format command can be formed.

As a check result of the partition number, when it is judged that the partitions indicated by the storage capacity of MIC 4 provided to the tape cassette 1 can be formed (S003), the check of MIC 4 is performed again (S004).

If the result of the re-check of MIC 4 is "OK" (S005), the free pool top address, the free pool bottom address and the MIC capacity are read from MIC 4 again (S006). On the basis of the storage capacity information of MIC 4 stored in the MIC capacity, the free pool top address and the free pool bottom address are set (S007).

Further, the drive initialize part in the MIC header is initialized (S008), and when the result of the initialization is "OK" (s009), MIC 4 is initialized by writing desired system data (partition information, accumulative partition information, absolute volume map information) (S010).

When the result of the initialization of MIC 4 is checked (S011) and it is judged as "OK", the processing is shifted to initialization of the magnetic tape 3, and desired data such as a device area, etc. are written (S012). If the initialization result of the magnetic tape 3 is judged as "OK", it is judged that the format of the tape cassette 1 has been completed (S013).

The judgment result in steps S003, S005, S009, S011, S013 is judged as "NO", occurrence of an error is regarded, and at that time a desired error code is set (S015) and the format processing is finished.

For example, the partition number check is performed in the step S002, and if the number of partitions to be formed is larger with respect to the storage capacity of MIC 4, the format is finished under the state that the desired error code is set. In this case, the partition number is re-set to a small number in connection with the storage capacity of MIC 4, whereby the format of the tape cassette 1 can be executed.

Further, when plural partitions are formed on the magnetic tape 3, the number of partitions which can be formed on the magnetic tape 3 of the tape cassette 1 can be known at the time when the storage capacity of MIC 4 is detected. Therefore, this partition number is set as a restriction value, and it can be supplied to the host computer 40, for example. Before the partition number is set from the host computer 40 side, it may be indicated how many partitions can be formed on the tape cassette 1.

What is claimed is:

1. A tape drive device comprising:

tape drive means for information recording or reproduction performed on a magnetic tape when a tape cassette having the magnetic tape accommodated therein is loaded;

memory drive means through which, when a memory for recording all management information to manage the recording or reproduction to the magnetic tape is provided to the tape cassette, a read-out or writing of the recording management information from/into the memory is performed, wherein the memory has stored therein header information;

means for detecting storage capacity information of the memory, said storage capacity information being contained in the header information of the memory;

means for recognizing a storage capacity of the memory on the basis of the detected storage capacity information; and control means for formatting the magnetic tape based on a number of partitions to be formed in the magnetic tape and based on the storage capacity information detected from the memory, wherein said control means includes means for setting an initial address of a memory free pool of the management information formed in the memory based on the storage capacity information.

2. The tape drive device as claimed in claim 1, wherein said control means includes means for setting the number of partitions to be formed on the magnetic tape based on the storage capacity information.

3. A storage medium including:

a tape cassette having a magnetic tape accommodated therein; and a memory provided to the tape cassette having all management information necessary to manage recording or reproduction to the magnetic tape, wherein the memory has header information stored therein and wherein storage capacity information of the memory is stored in the header information of the memory, and wherein the memory has a memory free pool area for setting a head address and a bottom address and for forming plural partition management information pieces corresponding to the plural partitions on the magnetic tape where the plural partition management information pieces are stored from the head address of the memory free pool, and a tape position information for a high-speed search operation is stored from the bottom address of the memory free pool.

4. The storage medium as claimed in claim 3 6 wherein the bottom address of the memory free pool is set based on the storage capacity information.

* * * * *